(No Model.)  5 Sheets—Sheet 4.
J. R. WOOD.
LASTING AND SOLE LAYING MACHINE.
No. 508,073. Patented Nov. 7, 1893.
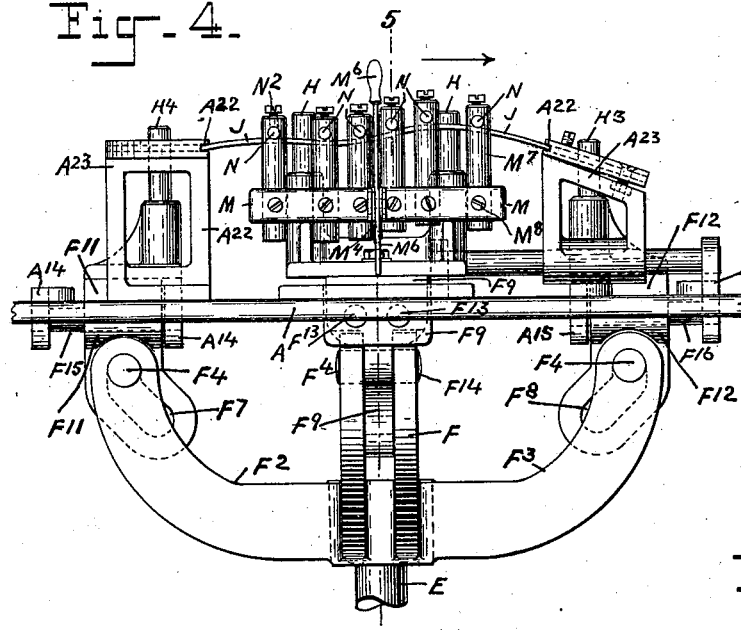
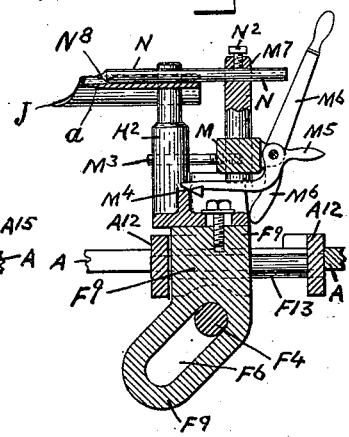
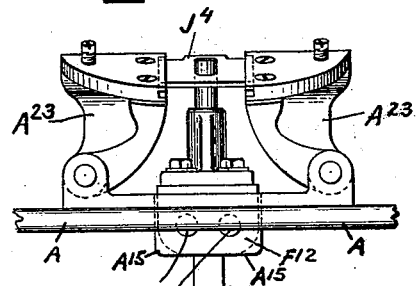
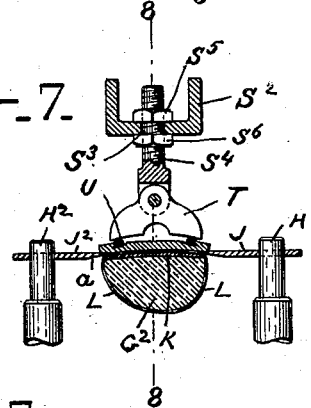
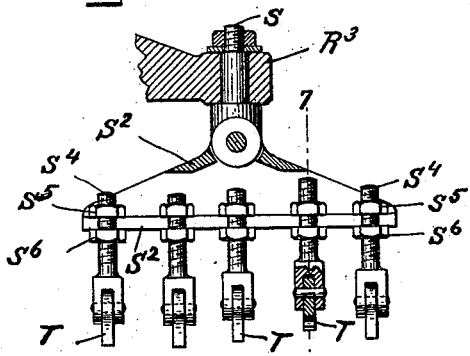
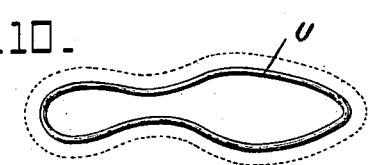
Witnesses.
John F. Nelson.
Marion E. Brown.
Inventor.
Julia R. Wood
by her Attorneys
Brown Bros.
THE NATIONAL LITHOGRAPHING COMPANY,
WASHINGTON, D. C.

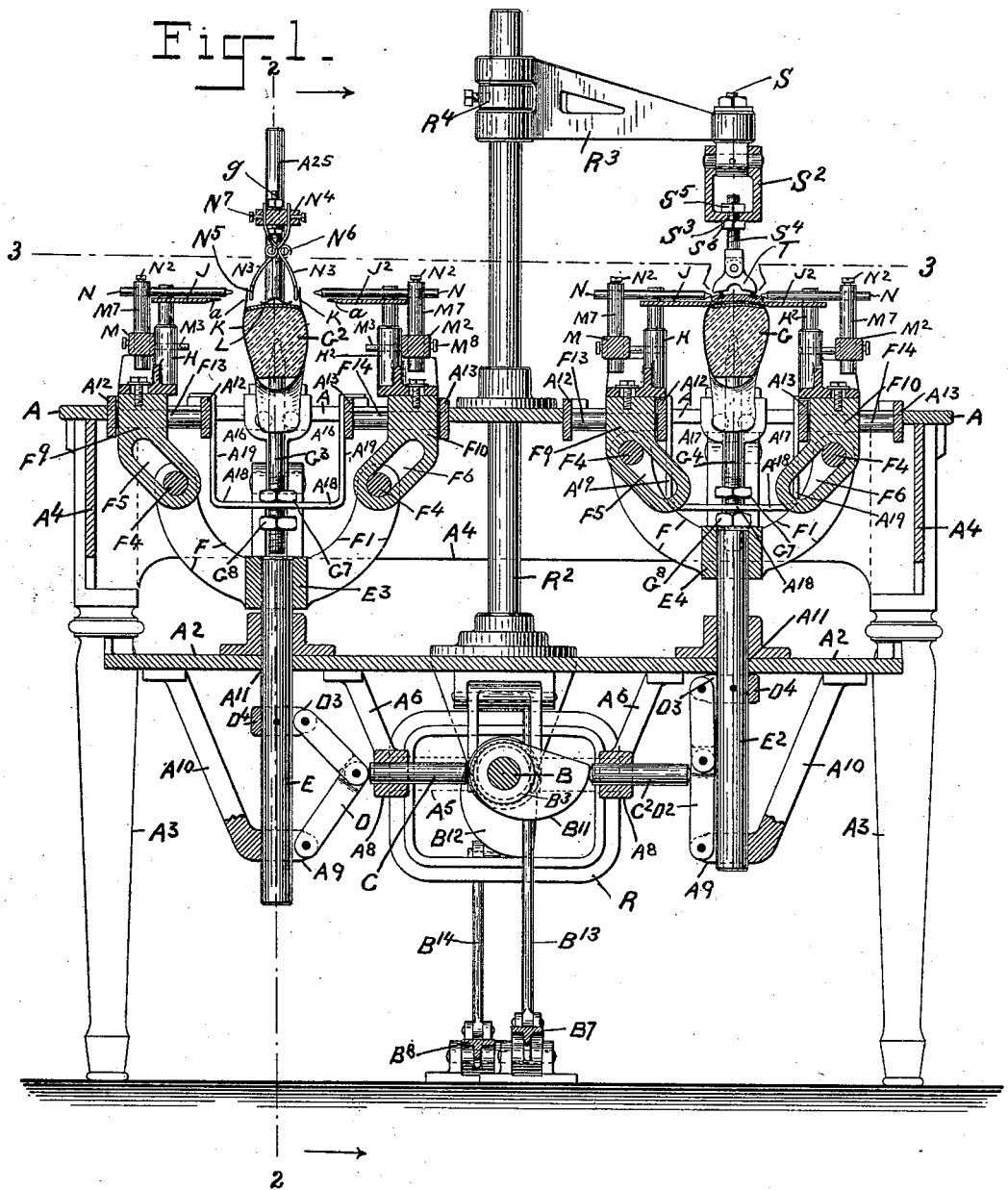

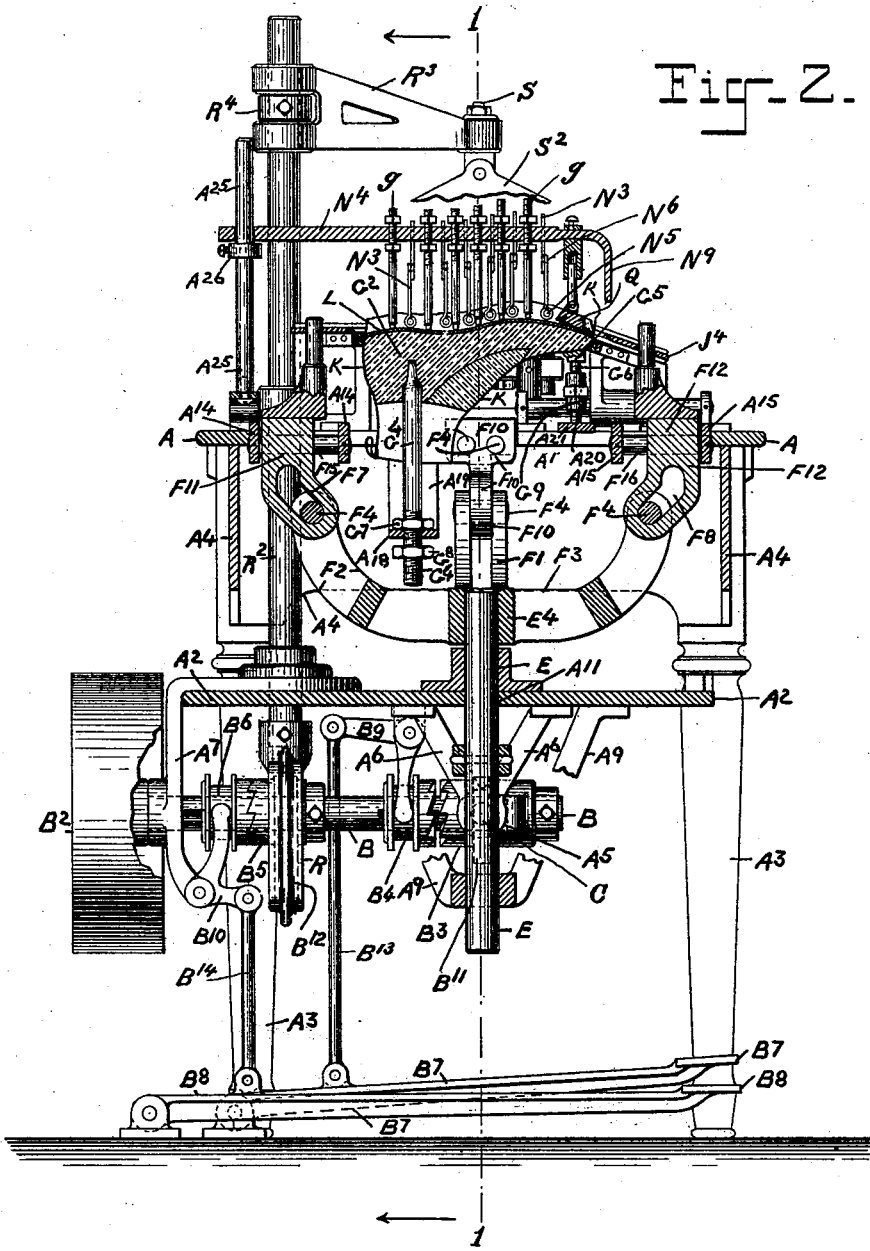

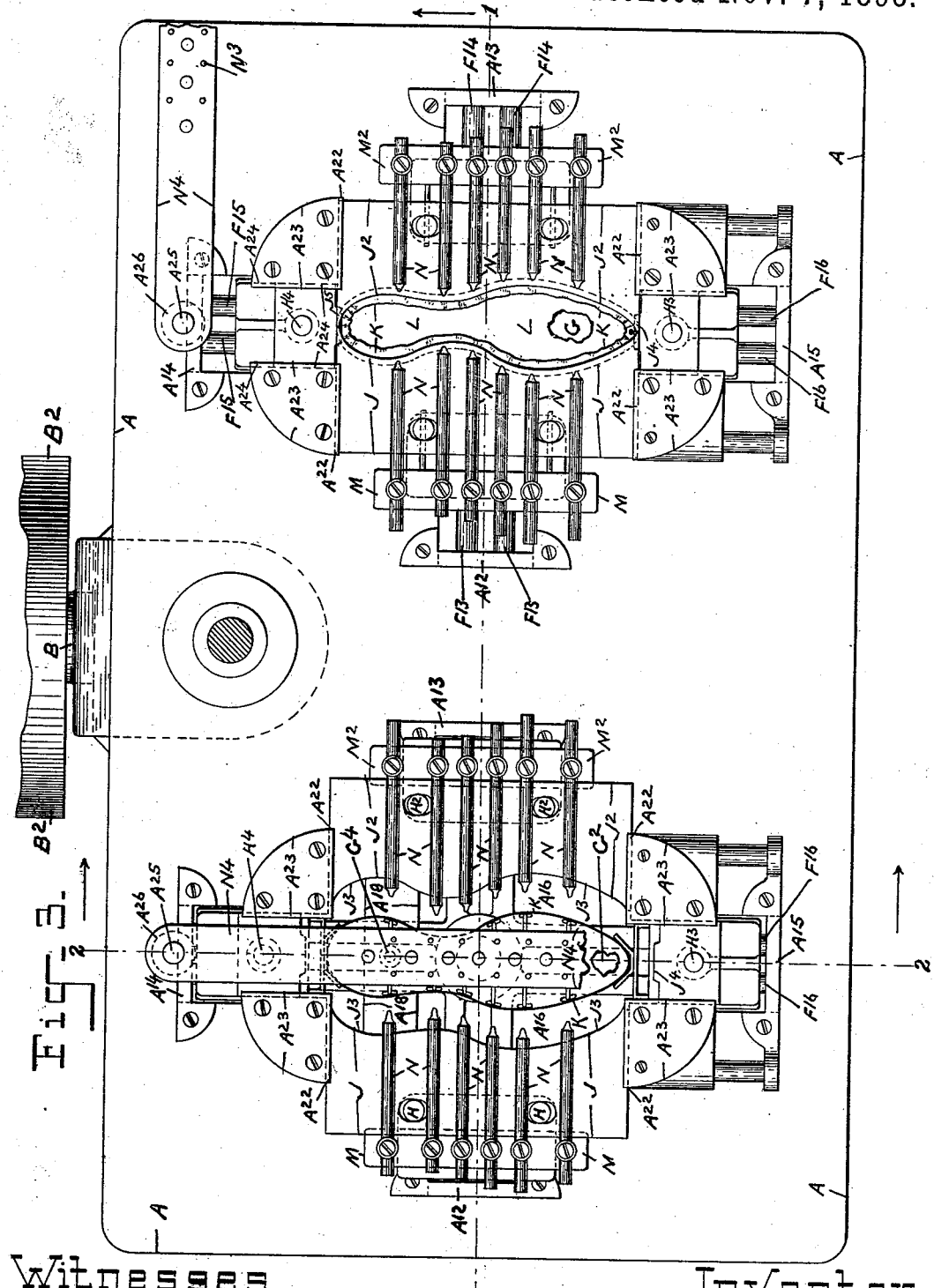

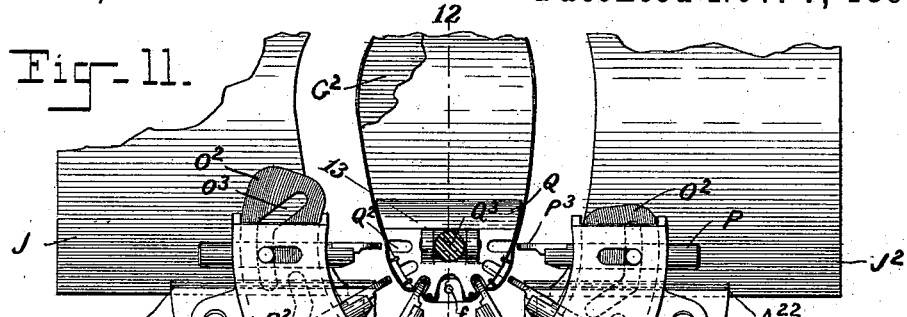
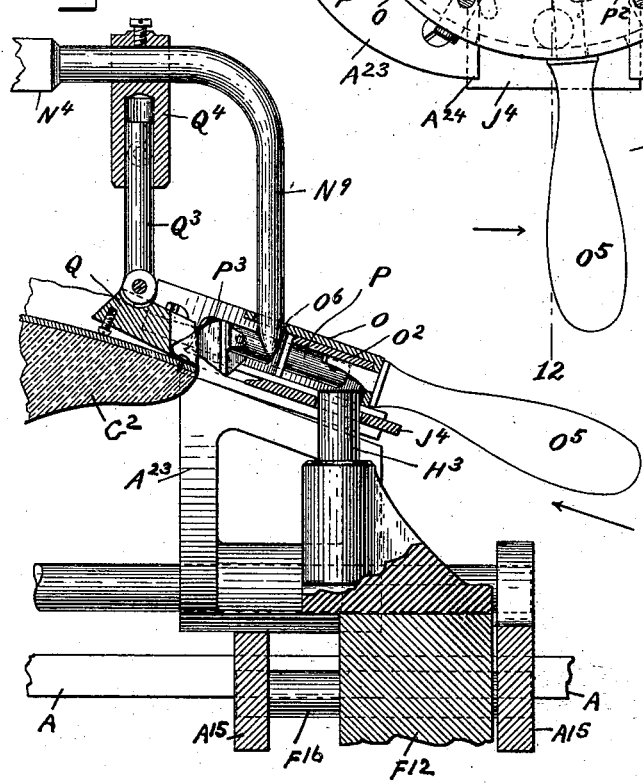
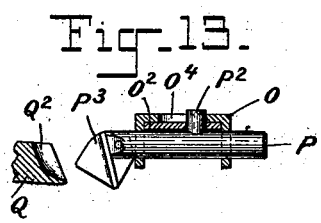
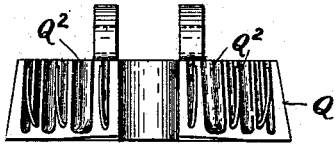
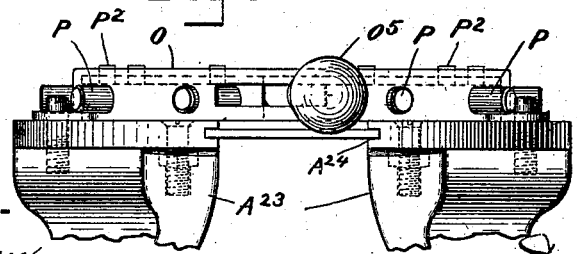

UNITED STATES PATENT OFFICE.

JULIA R. WOOD, OF FOXBOROUGH, MASSACHUSETTS.

LASTING AND SOLE-LAYING MACHINE.

SPECIFICATION forming part of Letters Patent No. 508,073, dated November 7, 1893.

Application filed November 17, 1892. Serial No. 452,312. (No model.)

*To all whom it may concern:*

Be it known that I, JULIA R. WOOD, a citizen of the United States of America, and a resident of the town of Foxborough, in the county of Norfolk and State of Massachusetts, have invented certain new and useful Improvements in Lasting and Sole-Laying Machines, of which the following is a full, clear, and exact description.

These improvements in lasting machines for boots and shoes consist, in substance, of mechanisms for gripping the upper, and drawing it over the edge of the sole; for holding the lasted upper on the last so that an outsole may be laid thereon; for pressing the outsole down onto the lasted insole and upper; for lasting the toe of the upper; for raising and lowering the last as the boot or shoe is being lasted thereon and of other details all of which are hereinafter described.

The drawings, forming part of this specification, illustrate a machine of this invention, in duplicate, that is to say, they illustrate two sets, nearly complete in all parts, of lasting mechanism as placed alongside of each other and supported on a common supporting framework, the one to last a right and the other to last a left boot or shoe and to lay the sole on either, and therefore, in many instances in the description hereinafter given, some of the parts, more especially those applied to the lasting mechanism, will be described and will appear in the drawings as lettered in duplicate.

In the drawings, Figure 1 is a longitudinal vertical section, line 1—1, Figs. 2 and 3. Fig. 2 is a transverse vertical section, line 2—2, Figs. 1 and 3. Fig. 3 is a plan view of the mechanism as shown, Figs. 1 and 2, with all parts of the machine above the plane of line 3—3, Fig. 2, removed, or to be more specific, the parts to lay and to allow of the laying of the sole. Fig. 4 is an enlarged elevation, in detail, and at the left hand end of the machine, Fig. 1. Fig. 5 is a vertical section, line 5—5, Fig. 4. Fig. 6 is a front elevation, in detail, of parts of the lasting machine and as hereinafter appears. Figs. 7, 8, 9 and 10 are views, in detail, of the sole laying mechanism, as hereinafter appears. Fig. 11 is an enlarged plan of the contrivances for lasting the toe of the upper by drawing it over, and crimping or disposing of it in folds on the sole of the boot or shoe properly presented therefor. Fig. 12 is a vertical section, in detail, line 12—12, Fig. 11. Fig. 13 is a detail view. Fig. 14 is a front elevation, in detail, of one of the parts shown, Figs. 11, 12 and 13. Fig. 15 is a front elevation, Fig. 11, on a plane of inclination, indicated by the arrow in Fig. 12.

The supporting framework of the machine consists, mainly, of upper and lower horizontal frames or open tables A, $A^2$, each of substantially corresponding rectangular outline and both supported at their several corners on legs or uprights $A^3$ at their upper portions rigidly joined and braced together by plates $A^4$, vertically placed. Otherwise than above said framework is adapted to support the working and stationary parts of the machine, all as hereinafter explained.

B is the driving-shaft. This shaft is horizontal and below and midway between the opposite ends and transversely to the length of the lower table $A^3$, and at one end-portion it turns in a suitable bearing of a horizontal cross-bar $A^5$, which extends between and is held on fixed hangers $A^6$, Figs. 1 and 2, of said table $A^3$, and at its other end-portion, it turns in a suitable bearing of a fixed hanger $A^7$, Fig. 2, of said table $A^3$.

$B^2$ is the driving pulley of shaft B to be connected by a belt,—(not shown)—to the driving power.

$B^3$, $B^4$ and $B^5$, $B^6$, Fig. 2, are two dog-clutches, on shaft B and each composed of a loose member $B^3$, $B^5$ and a sliding splined member $B^4$, $B^6$, and having each sliding member adapted to be moved into and out of clutch with the loose member, by means of treadle-levers $B^7$, $B^8$, respectively connected by connecting rods $B^{13}$, $B^{14}$ and bell-cranks $B^9$, $B^{10}$ to the sliding member of its appropriate clutch and all as well known.

$B^{11}$, $B^{12}$ are two cams. The cam $B^{11}$ is held on the loose member $B^3$ of the clutch $B^3$, $B^4$, and when said member is clutched to the shaft, the cam rotates therewith. The cam $B^{12}$ is held on the loose member $B^5$ of the clutch $B^5$, $B^6$, and when said member is clutched to the shaft, the cam rotates therewith. At the opposite sides of the cam $B^{11}$, are horizontal push-rods C, $C^2$, each supported in and free to move through a fixed ear-piece $A^8$ of each of the hangers $A^6$, before referred to, of the table $A^2$. The push-rods C, $C^2$, at one end-portion, are end to the cam $B^{11}$ but on opposite sides thereof, and at the other end-portion they are end to vertical toggle-levers D, $D^2$, respectively, and each toggle-lever has the lower end of one of its arms pivoted on fixed ear-pieces $A^9$ of hangers $A^{10}$ held on the lower table $A^2$, and the upper end of the other of its arms pivoted on ear-pieces $D^3$ of collars $D^4$ held on vertical lifting-rods E, $E^2$, respectively, and arranged to move through suitable guide-ways, $A^{11}$, of said lower table $A^9$, and hangers $A^9$, and all so that, on each rotation of the cam $B^{11}$, and the action thereon, through the push-rods and release of said push-rods from them, the arms of each of said toggle-levers are alternately opened or straightened out and allowed to close, in the first instance, lifting the lifting-rods, and in the second instance, allowing the lifting-rods to drop, alternately, however, as to each other.

$E^3$, $E^4$ are fixed collars at the upper ends of the lifting-rods E, $E^2$, respectively. Each collar $E^3$, $E^4$ has four outwardly and upwardly extending arms F, F′, $F^2$ and $F^3$. Said arms of each lifting-rod are in two vertical planes at right angles to each other.

$F^4$ are horizontal bearing-pins, one at the upper end of each of the aforesaid arms and the axes of the pins belonging to the arms of each lifting-rod E, $E^2$ are in lines, or directions, at right angles to the line or direction of the projection of said arms from said lifting-rods. The several bearing-pins $F^4$ of each lifting-rod E, $E^2$ engage vertical cam-slots $F^5$, $F^6$, $F^7$ and $F^8$, respectively, in blocks $F^9$, $F^{10}$, $F^{11}$, $F^{12}$, that are severally arranged and are free to move toward and away from each other on fixed horizontal and parallel separated round guide-rods $F^{13}$, $F^{14}$, $F^{15}$, $F^{16}$ each in pairs, a pair to each block. The several pairs of said guide-rods are mounted and supported at their opposite ends on vertical plates $A^{12}$, $A^{13}$, $A^{14}$, $A^{15}$, in pairs, rigidly held, in any suitable manner, one set in an opening $A^{16}$ and the other set in an opening $A^{17}$ of the upper table A of the supporting framework. Said cam-slots are such as to secure, from the upward and downward movements of the lifting-rods, horizontal movement of said blocks, in the opening $A^{16}$ or $A^{17}$ in which they are located, toward and away from each other, in any event and in either direction equal to the length of the extension of the cam-slots horizontally, but which may be more or less, according as the extent to which the lifting-rods are to be raised or lowered, as has been before described and will hereinafter fully appear.

In the openings $A^{16}$ and $A^{17}$ of the upper table A and within the space bounded by the several slide-blocks $F^9$, $F^{10}$, $F^{11}$, $F^{12}$, arranged as has been explained, are located right and left lasts G, $G^2$, respectively, and the sole-face of each last is uppermost and it is considerably above the horizontal plane of said slide-blocks and it extends, heel to toe, between the slide-blocks $F^{11}$, $F^{12}$ of each of said openings. The central longitudinal vertical plane of each last is coincident with the central vertical plane of said slide-blocks $F^{11}$, $F^{12}$, and at right angles to the central vertical plane of the slide-blocks $F^9$, $F^{10}$, and each last G, $G^2$, at its heel end-portion is held and supported on the upper end of vertical-rods $G^3$, $G^4$, respectively, and each of these rods, at its lower end-portion, passes through a horizontal portion $A^{18}$ of vertical stirrup-straps $A^{18}$, $A^{19}$, held on and depending from the inside edges of the plates, $A^{12}$ and $A^{13}$, of each pair of plates $A^{12}$ and $A^{13}$, respectively, and which support the pair of guide-rods $F^{13}$, $F^{14}$, for the slide-blocks $F^9$, $F^{10}$. The lower end-portion of each last supporting-rod $G^3$, $G^4$, is screw-threaded and receives screw-nuts $G^7$, $G^8$, the nut $G^7$ being above and the other below said horizontal strap $A^{18}$, and all so that, by their proper adjustment, each last may have an upward and a downward movement, as said lifting rods E, $E^2$ are raised and lowered, the upward movement, in each instance, being produced, as the lifting-rods E, $E^2$ are lifted by the abutment and lift of the arm $F^2$ on the lower screw-nut $G^8$, of each lifting-rod and the downward movement, in each instance, being in common with the fall of the lifting-rods, until arrested by the rest of the upper screw-nut $G^7$ of each rod on the fixed strap $A^{18}$ belonging to and making a guide for its movement, as before explained.

Each last, at its toe end-portion and in its lowermost or normal position, is supported, Fig. 2, on a rest-block $G^5$, suitably shaped for the last to seat and to be held against lateral or sidewise movement on it, and this rest-block is held on the upper end-portion of a vertical screw-threaded rod $G^6$, engaged at its lower end-portion, with one end of a double-ended screw-threaded nut $G^9$, that, at its other and lower end, engages a vertical screw-threaded rod $A^{20}$, rigidly held on a fixed horizontal-piece $A^{21}$, extending, one across each of the openings $A^{16}$, $A^{17}$, respectively, and secured to the upper table A, and all so that by turning the screw-nuts $G^9$, in one direction, its rest-block is raised, and in the other direction, it is lowered.

The slide-blocks $F^9$, $F^{10}$, at each side of each last G, $G^2$, have, at their opposite ends, fixed vertical posts H, $H^2$, over and on which are similar side-plates J, $J^2$ respectively, and each from end to end, substantially horizontal. Each side plate J, $J^2$, in position as stated, and from end to end has a curvature vertically corresponding generally to the curvature or near the outline and from toe to heel, of the sole of the last and the edge $J^3$, the inner, of each plate J, $J^2$ toward the last is from end to end of the general outline of the sole and has an under chamfer $a$. The side-plates J, $J^2$, when their respective carrier-blocks $F^9$, $F^{10}$, are moved toward each other, as before explained, close by their inner and chamfered edges upon and over the top and along the side length of the last, or rather, the upper K to be with the insole L lasted as hereinafter explained, and the upper K and insole L are clamped on the last and between it and said side-plates, but as and for a purpose which will hereinafter appear only at and just inside the outer edge of the insole. Each side-plate J, $J^2$, at its opposite ends, moves in guideways $A^{22}$ of blocks $A^{23}$, suitably located and held on the upper table A, and preferably, the plates are made of spring sheet steel, unconfined against movement on their post-supports, so that they can spring and yield, the better to adjust their chamfered edges to the varying conditions at the exposed faces and thicknesses of the insole and upper.

The slide-block $F^{11}$ at the toe and slide-block $F^{12}$, at the heel of each last G, $G^2$, have fixed vertical posts $H^3$, $H^4$ respectively, and over and on these posts are horizontal toe and heel-plates $J^4$, $J^5$, respectively.

The edges $J^6$, $J^7$, respectively, of the toe and heel-plates $J^4$, $J^5$ toward the toe and heel of the last, are at right angles to the central vertical longitudinal plane of the last, and they have a chamfer $b$, on their upper sides all so that when they are upon and over and across the toe and heel of the sole of the last, or rather of the upper K lasted upon the insole L, as hereinafter explained, the upper K and insole L at the toe and heel are clamped on the last between it and said toe and heel-plates, but as and for a purpose which will hereinafter appear only at and just inside the outer edge of the insole; and said side-plates J, $J^2$ overlap said heel and toe plates and thereon substantially meet in the central longitudinal and vertical plane of the last, thereby preventing pinching the upper where the toe and heel and side plates meet. The toe and heel-plates, preferably are entered into guide-ways $A^{24}$ of the blocks $A^{23}$ held on the upper table A, and before referred to, and preferably the toe-plate and said guide-ways therefor are arranged so that the toe-plate moves, in a more or less, upward inclined plane, corresponding substantially to that of the sole of the last at and upward from the toe toward the heel of the last, such inclination however, not being new in this invention.

M, $M^2$ are horizontal rectangular blocks, each located at and lengthwise along the outer side of the carrier-posts H, $H^2$ for the side-plates J, $J^2$. Both blocks M, $M^2$ are in a common horizontal plane below that of said side-plates and they are supported in the position stated, by horizontal-pins $M^3$, at their opposite end-portions and entered into and free to move through said vertical posts H, $H^2$. Each block M, $M^2$ has a lever-catch $M^4$ with handle $M^5$, for convenience to lock it to, and unlock it from the posts H, $H^2$ as the case may be, that support it, and all so that said blocks M, $M^2$ and said posts H, $H^2$ when locked together, as stated, will move as one, in either direction of movement of the carrier-blocks $F^9$, $F^{10}$, for said posts, and when unlocked to permit said blocks M, $M^2$ to be drawn back, or away from said posts, using for convenience a lever $M^6$, fulcrumed on the outer edge of each block M, $M^2$, and adapted to work against the outer face of said carrier-blocks $F^9$, $F^{10}$.

$M^7$, $M^7$ are round vertical posts each at its lower end-portion set into the rectangular blocks M, $M^2$, so as to be vertically adjusted thereon and as adjusted, made fast by set-screws $M^8$, one for each post. These posts $M^7$ are a series on and along the length of each block M, $M^2$ and each post has a horizontal rod N extending through and adjustable in it and as adjusted, fastened by a set-screw $N^2$. The several horizontal rods N of each block M, $M^2$ project toward the last G, $G^2$ to which they belong and each constitutes one member of a tool or parallel grippers, having its other member a spring gripper-finger $N^3$, all of which are held on and dependent from a common horizontal arm $N^4$, which at one end is supported by an adjustable collar $A^{26}$ of and is free to swing on, a fixed post $A^{25}$ of the upper table A, and in a position back of and midway between the two heels of the last.

There is a gripper-finger $N^3$ for each gripper-rod N, and the several fingers for each last G, $G^2$, are in two rows, and in pairs, and those of each pair face in opposite directions and intermediately of their height they abut against each other and cross each other over the last, as shown in Fig. 1. Again the several pairs are in parallel vertical planes coincident with those of the gripper-rods N at opposite sides of the lasts G, $G^2$. The lower ends of each pair of gripper-fingers and the axes of the gripper-rods belonging thereto are in the same horizontal plane, and their several horizontal planes, from end to end, of the last G, $G^2$, are in the line of a curve, corresponding to the vertical curvature of the sole face of the last, and also such that the pincher-rods in moving forward will pass directly over said sole face of the last, or rather in the practical use of the machine in lasting the upper face of the insole of the boot or shoe on the last G or $G^2$ as the case may be, all as will hereinafter appear. Each gripper-finger $N^3$, as particularly shown, is made of spring wire and it has, at its lower end, an eye $N^5$, and, between its two ends, a coil $N^6$, and its upper end-portion passes upward through and is fastened on the arm $N^4$ before referred to, by a set-screw $N^7$. Moreover, as above mentioned, each gripper finger of a pair crosses the other gripper finger above the last, as shown, in Fig. 1, thus allowing a vertical movement at the coil which counteracts the tendency to a curved downward movement at the eye and changes it to a substantially horizontal movement, thereby preventing it from striking the insole.

The forward end $N^8$ of each gripper-rod N is a more or less rounded nipple so as to co-operate with the eye $N^5$ of the gripper-finger to which it belongs, and insure a bite of the upper of the boot or shoe upper as the same is being lasted as hereinafter appears.

The left last $G^2$ and its lasting mechanism, so far as has been explained, are in their normal positions and the last shown, is shown as having, as well known, an upper K and insole L, preparatory to lasting. The right last G and its lasting mechanism so far as explained, are in their positions after the lasting of the upper and insole, with which the lasts were prepared as before stated for the left last $G^2$.

The operation of the lasting mechanism for both lasts $G^2$, G, is from the rotation of a common driving shaft B, clutched to the driving pulley $B^2$, and a common cam B on said shaft which is arranged and adapted, in each rotation to work on the toggle levers D, $D^2$, one after the other, and thus, in one case, to lift the lifting-rod E, and in the other case, to lift the lifting rod $E^2$, and to allow each rod to lower, and all in a manner, acting through respective cams $F^4$, $F^5$, and during the lift of each lifting rod E, $E^2$, to move the several gripper-rods N, side plates J, $J^2$, and toe and heel-plates $J^4$, $J^5$, belonging to said lifting rods, toward and during the lowering of each lifting rod to move the said gripper-rods N and said side-plates and toe and heel-plates away from the last. The gripper-rods N, in their forward movement, press against the upper K standing above and along the sides of the last, and force it forward and into contact with the gripper spring-fingers $N^3$ and confined between these two members of the grippers, the upper K is held and drawn over the edge of and laid upon the insole L as the forward movement of the gripper-rods continues and until it ends, when the lifting-rod has finished its upward movement. During the forward movement of the gripper-rods the last is lifted and the side-plates J, $J^2$ and toe and heel plates $J^4$, $J^5$ are moved forward,—(severally properly adjusted however as will hereinafter appear)—and all in a manner for the said plates to enter on lasted sides of the upper and in co-operation with the lift of the last to bind and hold said lasted portions of the upper on the last and also by the heel-plate to last the upper thereat over the inner sole and in co-operation with the lift of the last to bind and hold it on the last and also by the toe-plate to enter on the upper at the toe, which however has been previously lasted as is hereinafter described, or otherwise suitably, and in co-operation with the lift of the last, to bind and hold the upper at the toe on the last. The lasting of the upper and the hold of it on the last thus having been completed, the catches $M^4$ for the two series of gripper-rods are released and by means of the levers $M^6$ each series of said rods is drawn back leaving the side-plates J, $J^2$, in co-operation with the last holding the lasted upper in position, and the gripper spring-fingers $N^3$ are severally placed at one side, by suitably swinging their common carrier-arm $N^4$ and in this manner the lasted upper and insole are exposed to have an outsole placed and laid and made secure thereon, by mechanism to be brought into play and to work on the outsole, all as hereinafter explained and which, the outsole and insole and upper lasted being prepared with a suitable cement to insure sufficient adhesion between the outsole and the insole and upper.

The adjustment of the gripper-rods N and side-plates J, $J^2$ for work as explained is in substance as follows: The carrying bar M for each series of gripper-rods N is secured by the catch $M^4$ to the slide-block belonging thereto. The side-plates J, $J^2$,—first having selected those corresponding in outline with the last at their edge and otherwise as described,—are set upon the posts of their respective slide-block and entered at their ends into their respective guide-ways $A^{22}$ of fixed head-blocks $A^{23}$ and all otherwise so that on their forward movement their respective chamfered edges $a$ finally enter upon the lasted upper at and along the outer edge of the sole, the then lasted boot or shoe and its last having during the meantime, been lifted, and by means of the action of the lifting-rod on the post carrying the last, sufficiently to bind the lasted upper and insole between the side-plates and the last. Each pincher-rod of each series, caught on its respective slide-block as stated, is adjusted horizontally on its carrier-post $M^7$ to project at its working end $N^8$ to a point somewhat at the rear of the chamfered edge $a$ of the side slide-plate J, $J^2$ over which it belongs, and vertically by a vertical adjustment of said carrier-post on the common carrier block M, $M^2$, in each case by loosening the set-screws $M^8$, respectively, and setting each gripper-rod on its post, and the several posts on their said common block, and tightening said set-screws, all in such manner, that in the forward movement of the gripper-rods, which is in conjunction with that of said slide-plates, the gripper-rods and gripper-spring-fingers will severally act in co-operation and complete the lasting of the upper. By reason of the slide-plates extending beyond the ends of the gripper rods, as above mentioned, there is a strong and continuous pressure on the upper, below the gripper fingers and rods, drawing the upper up and over the last. Thus the pressure is in a continuous line and is not confined merely to the points grasped by the grippers. The sliding heel and toe-plates move simultaneously with the side-plates J, $J^2$, but preferably their operating cams $F^8$, $F^9$ are shaped, (Fig. 2,) to have their movement toward the upper at the heel and toe completed, when the movement of the side-plates toward the upper is only partially completed and during the completion of the forward movement of the side-plates over and into the heel and toe plates. This effect on the toe and heel-plates is accomplished by a shortening of the cam part of the slots, $F^7$, $F^8$ and having the remainder of the slots continued vertically. The heel-plate lasts the heel of the upper as well as holds it lasted as explained for the laying of the outsole. The toe-plate holds the toe of the upper in a similar and suitable manner, but preferably with lasting mechanism forming part of this invention and to be soon described.

In the lasting operation of the grippers, composed of the rods N and spring-fingers $N^3$ and as described, the upper is not only nipped by the grippers but beyond that gripped as it is engaged by the two members for the reason that it is forced by the pointed ends $N^8$ of the gripper-rods N into the eyes $N^5$ of the gripper-fingers N. The several side-plates J, $J^2$, lap over the upper side of the heel and toe plates $J^4$, $J^5$ when the several plates are in position holding the lasted upper as stated.

$g$ $g$ are a series of pending arms from the arm $N^4$, carrying the spring gripper-fingers, to rest on and hold the insole down on the last during the operation of lasting.

The lasting of the toe of the upper is under this invention by means now to be described, Figs. 11, 12, 13, 14 and 15 more particularly, it being understood that the upper is preferably secured to the last by a tack $f$.

O is a flat casing or shell, rectangular in cross section and semicircular along its length. This casing lies across and is held on the top of the head-blocks $A^{23}$, acting as guards to the forward and backward movement of the toe-plate, and its vertical central line is coincident with the vertical plane of the last, the toe of which is surrounded by it. The upper face of the head-blocks holding the casing as described has an inclination corresponding to the usual downward inclination of the sole of lasts and the casing is on a corresponding downward inclination, not new in this invention.

P, P are a series of similar horizontal toe lasting rods, three on each side of the central line of the shell, and at equal distances apart and each one the nearer to the central line at the same distance therefrom as the others of each series are from each other. These several rods are in radial lines and are arranged to be freely moved lengthwise through guide-ways, (Fig. 13) of the side walls of the shell and also of suitable length to have their end-portions which lie within the inner circular wall of the shell, properly presented for their work and to be withdrawn therefrom, as will hereinafter appear.

$O^2$ is a flat and circular metal plate within and fitting the shell and lying over the lasting rods each of which has a vertical stud $P^2$ to engage a cam slot $O^3$ of said plate, one for each lasting rod, and severally of said plate and also a radial slot $O^4$ of the upper wall of the shell, one for each of said cam-slots. Each cam-slot is of the character and shape shown, Fig. 11 and all of which is such that as the cam plate is reciprocated within the shell, using a handle $O^5$ attached to it for conveniently moving it, each lasting-rod is moved forward to and backward from the toe of the last a distance, in either direction, equal to the length of the radial slots, all of similar length, and the length of each such that the forward movement of each lasting rod is suitable for it to perform its work on the upper held on the last, in co-operation with a toe-block Q held just over the toe end of the last as will hereinafter appear. Again, the character and shape of the cam slot are also such as to move forward the lasting rods, to the full extent in pairs and order as follows:— first, the lasting rods, one next toward and on each side of the central line of the shell; second, the lasting rods next adjoining the last rods first moved, and, third, the lasting rods next adjoining the lasting rods last moved, and also until all the lasting-rods have been moved as stated to hold those which were first moved in their forward positions, in order to draw the fullness of the upper forward toward the center of the toe of the last, as in hand lasting.

Each lasting rod at its forward end has an edgewise vertical and fixed blade $P^3$ and having its forward end of a more or less acute shape in vertical direction.

The toe-block before generally referred to as acting in co-operation with the toe-lasting mechanism described, is flat and rounded at one end and laid flat on the last at the toe to correspond substantially with the shape of the toe. The rounded end has a series of separated vertical grooves or recesses $Q^2$ severally located correspondingly to the toe-lasting rods and to receive them when they are moved forward as described. This toe block rests at its toe end on the last and at its rear end it is hinged to the lower end of a vertical rod $Q^3$, adjustable in and out of a block $Q^4$, adjustable horizontally on the horizontal rod or arm $N^4$, having a downward extension $N^9$, entered into a socket $O^6$ at the inner edge of the shell O, carrying the toe lasting rods.

The lasting of the toe upper is secured by the toe lasting rods acting in co-operation with the grooves or notches of the toe-block and as the cam-slots are arranged as has been explained, the toe upper at each side of the center of the toe, is first lasted and held, followed by the lasting of the portion of the toe upper next thereto and so on out to the lasted sides of the upper, which and the then lasted toe-upper are then held by the plates J, $J^2$ and toe-plates $J^5$ all as has been herein explained. After lasting the toe-upper and holding it as stated the toe lasting rods P are withdrawn and the toe block Q removed from the machine, thus exposing the lasting boot or shoe for a sole to be laid by mechanism such as now to be described.

For laying the outer sole on the lasted boot or shoe as explained, the invention consists of mechanism as follows:

R is a vertical rectangular frame which surrounds the cam $B^{12}$ of the driving shaft B and is shaped as is also said cam and from the rotation of the cam to lift said frame and lower it alternately and once in each rotation of the driving cam $B^{12}$, provided the collar $B^5$, carrying said cam, has been clutched to the shaft by means of the clutching means hereinbefore described.

$R^2$ is a vertical rod fixed on the upper side of the up and down moving frame R and therefrom extended loosely through the upper and lower frames $A, A^2$ of the supporting framework, and thence considerably above the lasting mechanisms of both of the lasts $G, G^2$. The location of the rod $R^2$ is midway between the two lasts and its axis coincident with the transverse vertical plane of the two lifting-rods $E, E^2$ for the lasts $G, G^2$.

$R^3$ is a horizontal arm swiveled on the upper end-portion of the vertical rod $R^2$ and there supported by its forked end on a collar $R^4$ held, but adjustable up and down on the rod.

S is a vertical pin swiveled in the outer end of the arm $R^3$ and having horizontally hung on its lower end, a frame $S^2$, which has a slot $S^3$ along its under side and in which slot are located and depend therefrom, a series of screw rods $S^4$ held thereon and adjustable vertically by means of upper and lower screw-nuts $S^5, S^6$. Each depending screw rod has hung on its lower end a presser-foot T and the several presser-feet are adapted, when they are severally located over and brought down upon the lasted boot or shoe with the outsole laid thereon, to extend across the outsole and to press down on it only near its opposite side edges of and preferably in lieu of directly on the outsole, on it through a skeleton sole-frame U which has been preparatory therefor, located in the channel of the outsole.

The downward pressure on the outsole as stated, is secured by the downward movements of the parts described, by the action of the cam $B^{12}$ on the frame R surrounding it as has been before explained, and the relief of said pressure, as well as the further lifting of said parts, is secured by the upward action of said cam on said frame.

The outsole, as also the lasted upper and insole, before laying and pressing the outsole as has been stated, are preferably cemented so that thereby the outsole may be attached to the lasted boot or shoe suitably for being fastened.

With the outsole attached, the lasted boot or shoe is then ready for removal, it being understood that during the meantime, the side plates $J, J^2$ and toe and heel plates $J^4, J^5$ which, being situated as they were, in no way interfere with the sole laying as explained, have moved back to their normal positions, all as is obvious without further explanation.

Having thus described my invention, what I claim, and desire to secure by Letters Patent, is—

1. In a lasting machine, the combination of horizontally sliding side, heel and toe plates, as $J\ J^2\ J^4\ J^5$, adjustable gripper rods N having substantially round inner ends and mounted on sliding blocks whereby said gripper rods slide horizontally above the plates, and adjustable spring gripper fingers as $N^3$ formed at their lower ends into eyes $N^5$ set opposite and on a horizontal line with the inner ends of the gripper rods and with their vertical planes parallel with the periphery of the last, whereby the gripper rods grip the leather and hold it in the eyes at numerous points but not in a continuous line, substantially as set forth.

2. In a lasting machine, a series of pairs of spring gripper fingers $N^3$ secured to and depending from the arm $N^4$, each gripper finger of a pair being bent as shown and crossing the other twice, i.e., crossing and re-crossing the other of the pair, above the last, whereby the lower ends are prevented from swinging in the arc of a circle but are caused to move in a substantially horizontal line, and hence prevented from striking the inner sole, substantially as set forth.

3. In a lasting machine, the combination of the centrally located cam $B^{11}$ on the driving shaft B, the horizontally sliding pins $C\ C'$ actuated by the cam and on opposite sides thereof, the toggle joints $D\ D^2$ engaged by the pins, the vertical shafts $E\ E^2$ actuated by the toggles, frame or arms $F\ F'\ F^2\ F^3$, the sliding blocks $F^9\ F^{10}\ F^{11}\ F^{12}$ slotted at $F^5\ F^6\ F^7\ F^8$, and suitable lasting mechanism substantially as described.

4. In a lasting machine, the mechanism for laying the outsole, comprising the endwise moving shaft $R^2$ extending vertically from the table at the rear and between the two lasting mechanisms, the arm $R^3$ extending horizontally from said shaft, the longitudinally slotted frame $S^2$ supported by a swivel connection with the free end of the arm, the screw rods $S^4$ adjustably secured in the slot in said frame, the presser feet T, and suitable lasting mechanism, substantially as described.

5. In a lasting machine, the combination of the semi-circular plate O provided with the radial guide slots $O^4$, the semi-circular plate $O^2$ provided with the diagonal cam-slots $O^3$, the radial toe-lasting rods P engaging with the said diagonal and radial slots by means of studs and moving longitudinally on radial lines, the inner ends of said toe lasting rods being provided with blades curved in horizontal section, and a toe-block provided with uprights corresponding in shape with and serving as seats for said curved blades, substantially as set forth.

In testimony whereof I have hereunto set my hand in the presence of two subscribing witnesses.

JULIA R. WOOD.

Witnesses:
ALBERT W. BROWN,
MARION E. BROWN.